United States Patent
Lee et al.

(10) Patent No.: US 9,793,789 B2
(45) Date of Patent: Oct. 17, 2017

(54) APPARATUS AND METHOD FOR PROTECTING GRID-CONNECTED INVERTER FROM OCCURRENCE OF LOW GRID VOLTAGE

(71) Applicant: POSCO ENERGY CO., LTD., Seoul (KR)

(72) Inventors: Jeong Heum Lee, Pohang-si (KR); Sang Ho Moon, Pohang-si (KR); Ju Young Chang, Pohang-si (KR); Jae Sig Kim, Cheongju-si (KR); Jin Su Lee, Pohang-si (KR)

(73) Assignee: POSCO ENERGY., LTD. (KR)

( * ) Notice: Subject to any disclaimer, the term of this patent is extended or adjusted under 35 U.S.C. 154(b) by 0 days.

(21) Appl. No.: 14/898,775

(22) PCT Filed: Jun. 20, 2014

(86) PCT No.: PCT/KR2014/005459
§ 371 (c)(1),
(2) Date: Dec. 16, 2015

(87) PCT Pub. No.: WO2014/208933
PCT Pub. Date: Dec. 31, 2014

(65) Prior Publication Data
US 2016/0373003 A1    Dec. 22, 2016

(30) Foreign Application Priority Data

Jun. 26, 2013    (KR) ................. 10-2013-0073771

(51) Int. Cl.
*H02M 1/32* (2007.01)
*H02J 3/00* (2006.01)
(Continued)

(52) U.S. Cl.
CPC ............. *H02M 1/32* (2013.01); *H02J 3/00* (2013.01); *H02M 1/08* (2013.01); *H02M 7/44* (2013.01);
(Continued)

(58) Field of Classification Search
CPC ............ H02M 1/08; H02M 1/32; H02M 7/44; H02M 7/48; H02M 2001/0006;
(Continued)

(56) References Cited

U.S. PATENT DOCUMENTS 5,548,464 A * 8/1996 Manning ................. H02H 1/06
361/18
6,009,003 A   12/1999 Yeo
(Continued)

FOREIGN PATENT DOCUMENTS

CN    102005777    4/2011
CN    103066624    4/2013
(Continued)

OTHER PUBLICATIONS

International Search Report, International Application No. PCT/KR2014/005459, dated Sep. 23, 2014.
(Continued)

*Primary Examiner* — Kyle J Moody
(74) *Attorney, Agent, or Firm* — Perman & Green LLP (57) ABSTRACT

An apparatus for protecting a grid-connected inverter from a low grid voltage includes a first output current sensor configured to sense an output current of a grid-connected inverter, a first output current calculator configured to calculate a D-axis current and a Q-axis current of the output current to obtain the output current that is sensed, and a first output current controller configured to determine whether a difference between the output current and a reference current exceeds a predetermined range, and to decrease the output
(Continued)

current by a predetermined value when the difference between the output current and the reference current exceeds the predetermined range.

4 Claims, 6 Drawing Sheets

(51) Int. Cl.
*H02M 1/08* (2006.01)
*H02M 7/44* (2006.01)
*H02M 7/537* (2006.01)
*H02M 1/00* (2006.01)

(52) U.S. Cl.
CPC .... *H02M 7/537* (2013.01); *H02M 2001/0009* (2013.01)

(58) Field of Classification Search
CPC . H02M 2001/0009; H02M 2001/0019; H02M 7/537; H02J 3/00
USPC ..... 361/18, 93.1; 363/16, 17, 19, 37, 95, 97, 363/131, 132
See application file for complete search history.

(56) References Cited

U.S. PATENT DOCUMENTS

| | | | | |
|---|---|---|---|---|
| 6,642,689 | B2* | 11/2003 | Ishida | B60L 9/22 318/807 |
| 8,760,094 | B2* | 6/2014 | Solodovnik | H02H 7/125 318/400.21 |
| 8,848,400 | B2* | 9/2014 | Yuan | G05F 1/70 323/207 |
| 9,312,788 | B2* | 4/2016 | Xue | H02M 7/537 |
| 2011/0089693 | A1* | 4/2011 | Nasiri | F03D 7/0272 290/44 |
| 2012/0286754 | A1 | 11/2012 | Chen | |
| 2013/0058139 | A1* | 3/2013 | Bae | H02H 3/38 363/55 |
| 2014/0056041 | A1* | 2/2014 | Zhu | H02M 3/1584 363/56.01 |
| 2014/0232309 | A1 | 8/2014 | Zhou et al. | |
| 2014/0265951 | A1* | 9/2014 | Gebregergis | H02P 21/22 318/400.02 |
| 2015/0188401 | A1* | 7/2015 | Zheng | H02M 1/00 363/95 |
| 2016/0126828 | A1* | 5/2016 | Lee | H02M 7/04 363/55 |

FOREIGN PATENT DOCUMENTS

| | | |
|---|---|---|
| JP | 05252751 | 9/1993 |
| JP | H05252751 * | 9/1993 |
| JP | 09074685 | 3/1997 |
| JP | 10194613 | 7/1998 |
| JP | 2000333473 | 11/2000 |
| JP | 2001136664 | 5/2001 |
| JP | 2013102670 | 5/2013 |
| KR | 20090096842 | 9/2009 |
| WO | 2012155297 | 11/2012 |
| WO | 2013046728 | 4/2013 |

OTHER PUBLICATIONS

Japanese Office Action, Japanese Application No. 2016-523634, dated Mar. 14, 2017.
European Supplementary Search Report, European Application No. 14818507.7, dated Mar. 13, 2017.
Chinese Office Action, Chinese Application No. 201480036726.9, dated Apr. 28, 2017.

* cited by examiner

APPARATUS AND METHOD FOR PROTECTING GRID-CONNECTED INVERTER FROM OCCURRENCE OF LOW GRID VOLTAGE

CROSS REFERENCE TO RELATED APPLICATIONS

This application is the National Stage of International Application No. PCT/KR2014/005459, having an International Filing Date of 20 Jun. 2014, which designated the United States of America, and which International Application was published under PCT Article 21 (2) as WO Publication No. 2014/208933 A1, and which claims priority from and the benefit of Korean Application No. 10-2013-0073771, filed on 26 Jun. 2013, the disclosures of which are incorporated herein by reference in their entirety.

BACKGROUND

1. Field

The presently disclosed embodiment relates to protection of a grid-connected inverter, and more particularly, to a technology of preventing overcurrent by restricting an output current of a grid-connected inverter when a low grid voltage occurs.

2. Brief Description of Related Developments

In general, a grid-connected inverter generates power in synchronization with an output current reference value. However, if an instant low voltage phenomenon occurs in a grid, a difference generates between an output voltage of the grid-connected inverter and a grid voltage, and accordingly, an output current of the grid-connected inverter rapidly increases. Accordingly, unless an output current of the grid-connected inverter decreases when a low grid voltage occurs in a grid, overcurrent trips of the grid-connected inverter are generated.

SUMMARY

The presently disclosed embodiment provides an apparatus and method of protecting a grid-connected inverter from a low grid voltage, capable of decreasing an output current by indirectly detecting a low voltage of a grid through an abnormal increase in an output current.

According to an aspect of the presently disclosed embodiment, there is provided an apparatus for protecting a grid-connected inverter from a low grid voltage, the apparatus including: a first output current sensor configured to sense an output current of a grid-connected inverter; a first output current calculator configured to calculate a D-axis current and a Q-axis current of the output current to obtain the output current that is sensed; and a first output current controller configured to determine whether a difference between the output current and a reference current exceeds a predetermined range, and to decrease the output current by a predetermined value when the difference between the output current and the reference current exceeds the predetermined range.

The apparatus may further include a first timer configured to count a predetermined time period after decreasing the output current by the predetermined value, wherein the first output current controller may determine whether the predetermined time period has passed, and return the decreased output current to the output current of an original magnitude.

According to an aspect of the presently disclosed embodiment, there is provided an apparatus for protecting a grid-connected inverter from a low grid voltage, the apparatus including: a second output current sensor configured to sense an output current of the grid-connected inverter; a second output current calculator configured to calculate a D-axis current and a Q-axis current of the output current that is sensed to obtain the output current; and a second output current controller configured to determine whether a difference between the output current and a reference current exceeds a predetermined range, and to decrease the output current by a predetermined value when the difference between the output current and the reference current exceeds the predetermined range.

The apparatus may further include a second timer configured to count a predetermined time period after decreasing the output current by the predetermined value, wherein the second output current controller may determine whether the predetermined time period has passed, and return the decreased output current to the output current of an original magnitude.

According to an aspect of the presently disclosed embodiment, there is provided a method of protecting a grid-connected inverter from a low grid voltage, the method including: sensing an output current of the grid-connected inverter by using a first output current sensor; calculating a D-axis current and a Q-axis current of the output current to obtain the output current by using a first output current calculator; determining whether a difference between the output current and a reference current exceeds a restricted current by using the first output current controller; and when the difference between the output current and the reference current exceeds the predetermined range, decreasing the output current by a predetermined value by the first output current controller.

The method may further include: determining whether a predetermined time period has passed after decreasing the output current by the predetermined value by using a first timer; and when the predetermined time period has passed, returning the output current that has decreased to the output current of an original magnitude by the first output current controller.

According to an aspect of the presently disclosed embodiment, there is provided a method of protecting a grid-connected inverter from a low grid voltage, the method including: sensing an output current of the grid-connected inverter by using a second output current sensor; calculating a D-axis current and a Q-axis current of the output current to obtain the output current by using a second output current calculator; determining whether a difference between the output current and a reference current exceeds a restricted current by using the second output current controller; and when the difference between the output current and the reference current exceeds the predetermined range, decreasing the output current by a predetermined value by the second output current controller.

The method may further include: determining whether a predetermined time period has passed after decreasing the output current by the predetermined value by using a second timer; and when the predetermined time period has passed, returning the output current that has decreased to the output current of an original magnitude by the second output current controller.

According to one or more exemplary aspects, a low voltage in a grid may be indirectly detected by using an abnormal increase in an output current, and thus, breakdown of a grid-connected inverter due to overcurrent may be prevented.

DETAILED DESCRIPTION

Hereinafter, a protecting apparatus of a grid-connected inverter from a low grid voltage according to aspects of the presently disclosed embodiment will be described in detail with reference to accompanying drawings.

Figure 1:
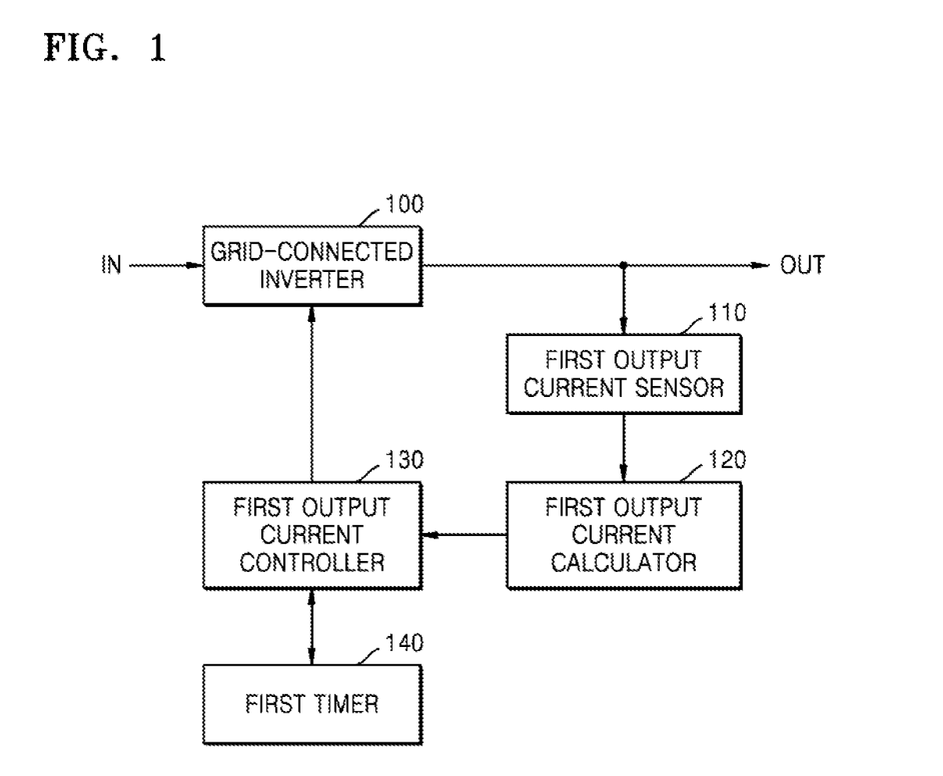
FIG. 1 is a block diagram of a protecting apparatus of a grid-connected inverter from a low grid voltage according to an aspect of the presently disclosed embodiment.

FIG. 1 is a block diagram of a protecting apparatus of a grid-connected inverter from a low grid voltage, and the protecting apparatus includes a grid-connected inverter 100, a first output current sensor 110, a first output current calculator 120, a first output current controller 130, and a first timer 140.

The grid-connected inverter 100 is an inverter connected to a power grid in order to supply electric power to a grid. A direct current (DC) power input through an input terminal IN is converted into an alternating current (AC) power in the grid-connected inverter 100 and then transferred to the power grid via an output terminal OUT.

The first output current sensor 110 senses an output current of the grid-connected inverter 100, and outputs a sensing result to the first output current calculator 120. The first output current sensor 110 includes a measurement sensor for sensing the output current.

The first output current calculator 120 calculates a D-axis and a Q-axis currents of the output current sensed by the first output current sensor 110 to obtain the output current, and outputs the calculated output current to the first output current controller 130. The first output current calculator 120 calculates the D-axis current and the Q-axis current of the output current, and calculates the output current by obtaining a root value of a sum of the square of the D-axis current and the square of the Q-axis current. The D-axis current and Q-axis current are obtained from a synchronous reference frame transformation of the output current (U, V, and W) of the grid-connected inverter 100. In general, the D-axis current corresponds to a reactive power and the Q-axis current corresponds to an active power.

The first output current controller 130 determines whether a difference between the output current calculated by the first output current calculator 120 and a reference current exceeds a predetermined range. The reference current is a reference value of the output current when a grid voltage is normal. In addition, the predetermined range denotes a range limit from the reference current, in which the output current does not cause breakdown of the grid-connected inverter. When the difference between the output current and the reference current exceeds the predetermined range, the first output current controller 130 controls the grid-connected inverter 100 to decrease the output current by a predetermined value.

Figure 2:
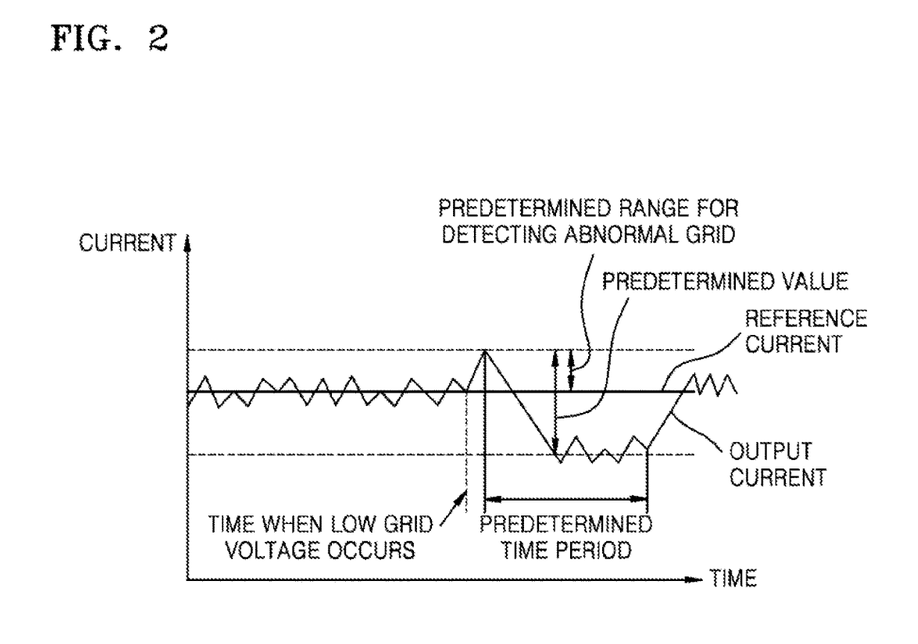
FIG. 2 is a graph showing a reduction in an output current according to a first output current controller of FIG. 1.

FIG. 2 is a graph showing the reduction in the output current according to the first output current controller 130 of FIG. 1. As shown in FIG. 2, when the output current is normally output while varying a fine amount based on the reference current and then a low grid voltage occurs, the output current suddenly increase after the occurrence of the low grid voltage. Accordingly, when it is determined that the output current that has increased suddenly exceeds the predetermined range from the reference current, the first output current controller 130 controls the grid-connected inverter 100 to decrease a magnitude of the output current to a predetermined value or less. Accordingly, the grid-connected inverter 100 outputs the output current that has decreased to the predetermined value or less, with respect to the current having a magnitude out of the predetermined range from the reference current.

In addition, the first output current controller 130 controls the first timer 140 to start a timing operation at the time when the output current is reduced to the predetermined value or less.

The first timer 140 counts the time according to a timing start command from the first output current controller 130. After that, the first output current controller 130 determines whether the time period counted by the first timer 140 exceeds a predetermined time period (e.g., 100 ms). Here, the predetermined time period denotes a sufficient time to solve the abnormality of the grid voltage.

If the predetermined time period has lapsed, the first output current controller 130 controls the grid-connected inverter 100 to increase the output current that has decreased to the original magnitude, and accordingly, the grid-connected inverter 100 outputs the output current of the original magnitude.

Figure 3:
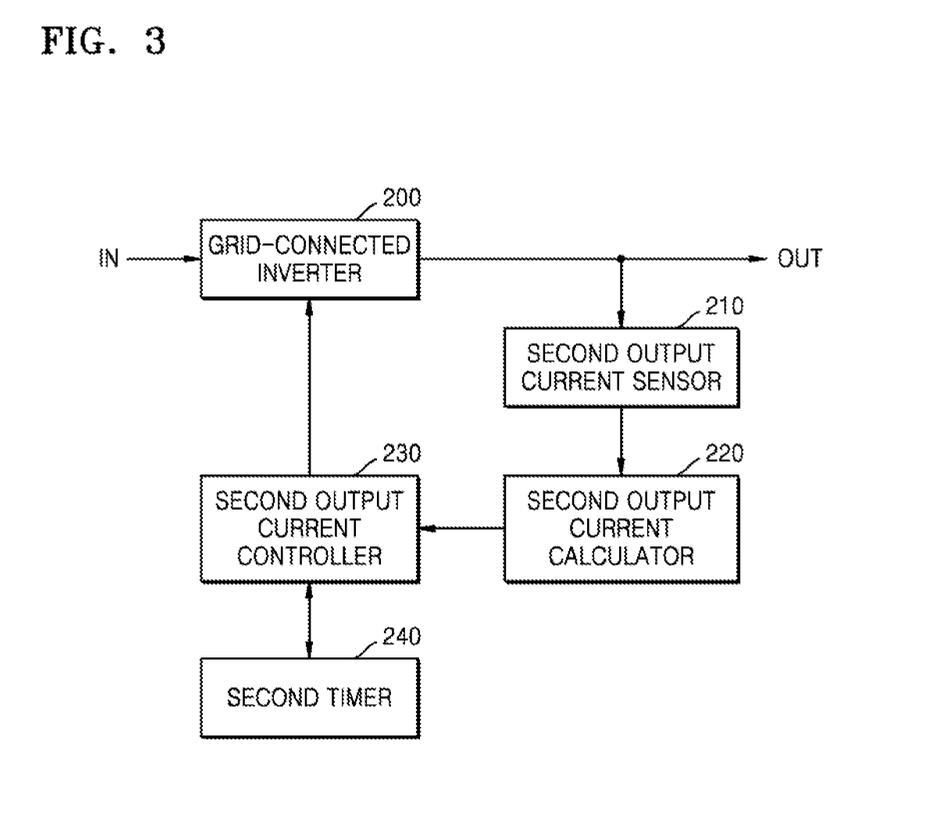
FIG. 3 is a block diagram of a protecting apparatus of a grid-connected inverter from a low grid voltage, according to an aspect of the presently disclosed embodiment.

FIG. 3 is a block diagram of a protecting apparatus of a grid-connected inverter from low grid voltage, according to another aspect of the presently disclosed embodiment, and the protecting apparatus includes a grid-connected inverter 200, a second output current sensor 210, a second output current calculator 220, a second output current controller 230, and a second timer 240.

The grid-connected inverter 200 is an inverter connected to a power grid in order to supply power to a grid, and detailed descriptions thereof are omitted since the grid-connected inverter 200 is the same as the grid-connected inverter 100 described above.

The second output current sensor 210 senses an output current of the grid-connected inverter 200, and outputs a sensing result to the second output current calculator 220. The second output current sensor 210 includes a measurement sensor for sensing the output current.

The second output current calculator 220 calculates a D-axis and a Q-axis currents of the output current sensed by the second output current sensor 210 to obtain the output current, and outputs the calculated output current to the second output current controller 230. Since the second output current calculator 220 is the same as the first output current calculator 120, detailed descriptions thereof are omitted.

The second output current controller 230 determines whether the output current calculated by the second output current calculator 220 exceeds a restricted current. The restricted current denotes a limit current at which the output current is likely to cause breakdown of the grid-connected inverter. When the output current exceeds the restricted current, the second output current controller 230 controls the grid-connected inverter 200 to decrease the output current by a predetermined value.

Figure 4:
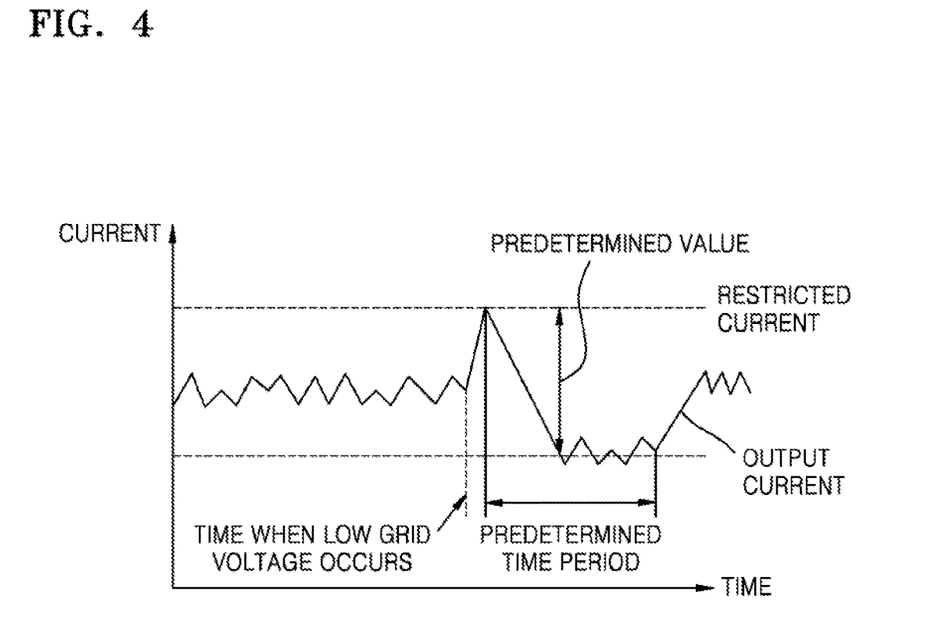
FIG. 4 is a graph showing a reduction in an output current according to a second output current controller of FIG. 3.

FIG. 4 is a graph showing a reduction in the output current according to the second output current controller 230. As shown in FIG. 4, when the output current is normally output and then a low grid voltage occurs, the output current is suddenly increased after the time when the low grid voltage occurs. Accordingly, when it is determined that the output current that has increased exceeds the restricted current, the second output current controller 230 controls the grid-connected inverter 200 to decrease the output current to a predetermined magnitude or less. Accordingly, the grid-connected inverter 200 outputs the output current having the magnitude that is reduced a predetermined value from the restricted current.

In addition, the second output current controller 230 controls the second timer 240 to start a timing operation at the time when the output current is reduced to a predetermined value or less.

The second timer 240 counts the time according to the timing start command from the second output current controller 230. After that, the second output current controller 230 determines whether the time period counted by the second timer 240 exceeds a predetermined time period (e.g., 100 ms). Here, the predetermined time period denotes a sufficient time for solving the abnormality of the grid voltage.

If the predetermined time period has lapsed, the second output current controller 230 controls the grid-connected inverter 200 to increase the output current to an original magnitude. Accordingly, the grid-connected inverter 200 outputs the output current of the original magnitude.

Hereinafter, a method of protecting the grid-connected inverter from the low grid voltage according to aspects of the presently disclosed embodiment will be described below with reference to accompanying drawings.

Figure 5:
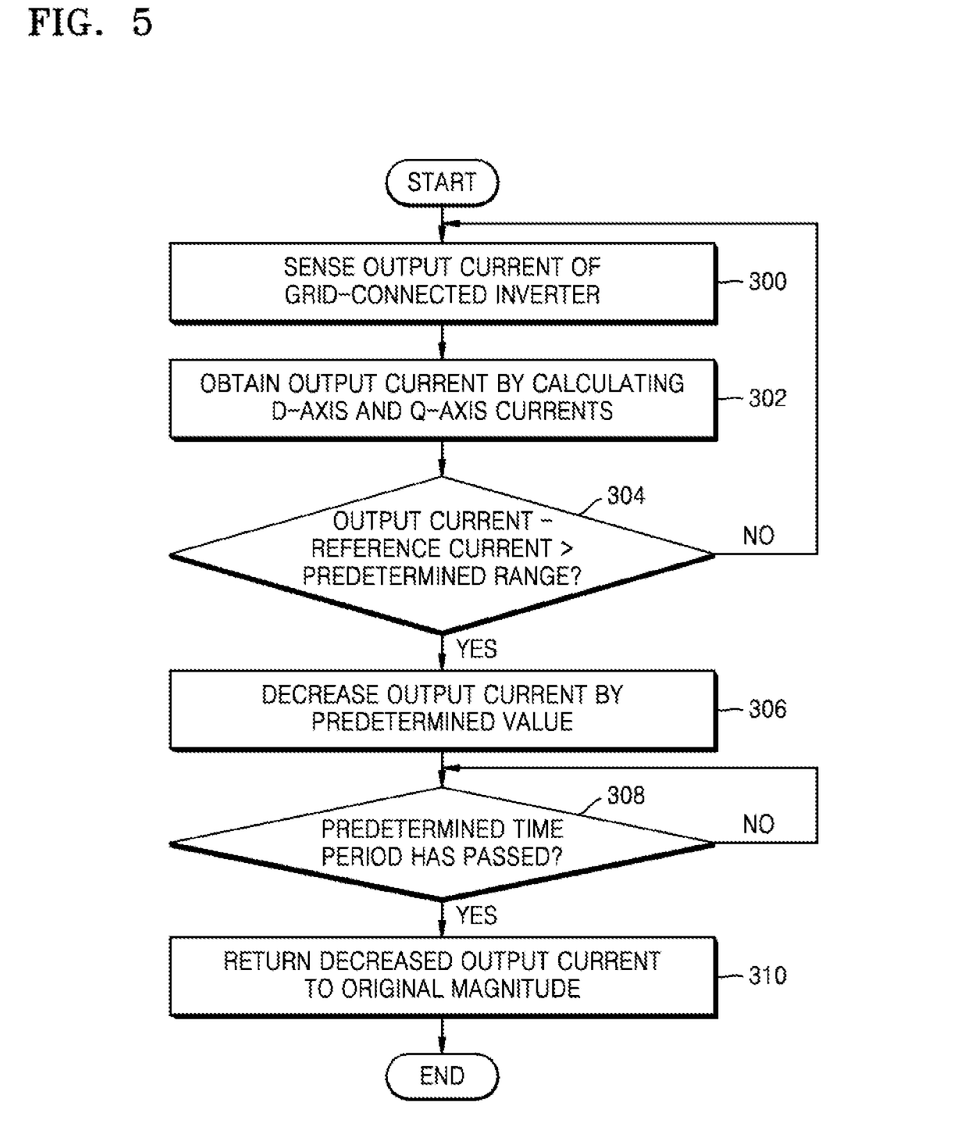
FIG. 5 is a flowchart illustrating a method of protecting a grid-connected inverter from a low grid voltage, according to an aspect of the presently disclosed embodiment.

FIG. 5 is a flowchart illustrating the method of protecting the grid-connected inverter from the low grid voltage, according to an aspect of the presently disclosed embodiment.

The first output current sensor 110 senses the output current from the grid-connected inverter 100 (300).

After operation 300, the first output current calculator 120 calculates the D-axis current and the Q-axis current of the output current that is sensed, to obtain the output current (302). The first output current calculator 120 calculates the D-axis current and the Q-axis current of the sensed output current, and obtains the output current by calculating a root value of a sum of the square of the D-axis current and the square of the Q-axis current.

After that, the first output current controller 130 determines whether a difference between the output current and the reference current exceeds a predetermined range (304). The reference current is a reference value of the output current when the grid voltage is normal, and the predetermined range is a limit range from the reference current, in which the output current does not cause the breakdown of the grid-connected inverter.

After operation 304, when the difference between the calculated output current and the reference current exceeds the predetermined range, the first output current controller 130 decreases the output current by a predetermined value (306). Since there may be a defect in the grid voltage when the difference between the calculated output current and the reference current exceeds the predetermined range, the first output current controller 130 controls the grid-connected inverter 100 to decrease the output current by the predetermined value. Accordingly, the grid-connected inverter 100 outputs the output current that has decreased to the predetermined value or less, with respect to the current having a magnitude out of the predetermined range from the reference current.

After operation 306, the first output current controller 130 determines whether a predetermined time period has passed after the output current has decreased by a predetermined value (308). Here, the predetermined time period denotes a sufficient time to solve the abnormality of the grid voltage.

After operation 308, if the predetermined time period has passed, the first output current controller 130 returns the decreased output current to the original magnitude (310). If the predetermined time period has passed, the first output current controller 130 controls the grid-connected inverter 100 to output the output current of the original magnitude from the decreased output current. Accordingly, the grid-connected inverter 100 outputs the output current of the original magnitude.

Figure 6:
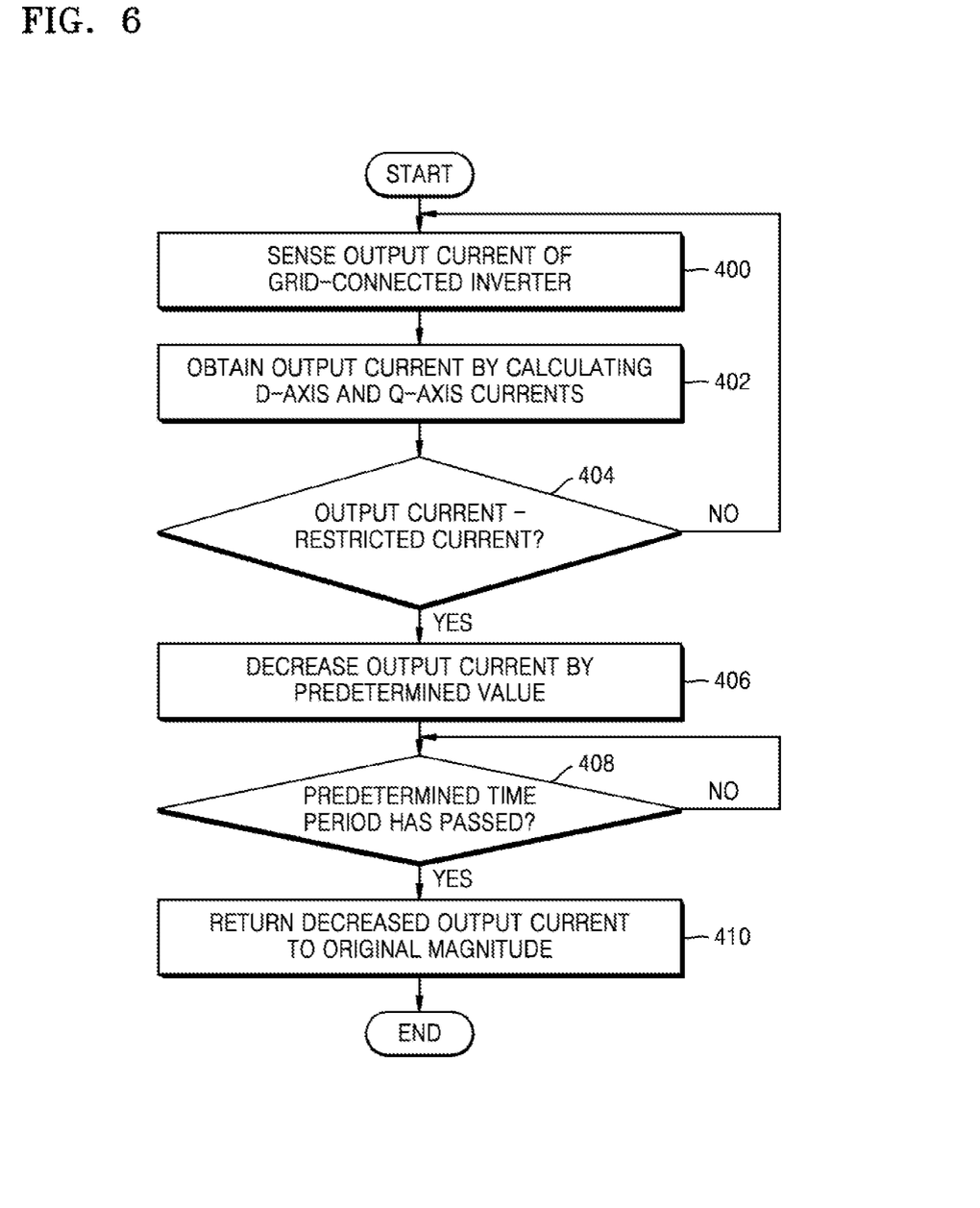
FIG. 6 is a flowchart illustrating a method of protecting a grid-connected inverter from a low grid voltage, according to an aspect of the presently disclosed embodiment.

FIG. 6 is a flowchart illustrating a method of protecting a grid-connected inverter from a low grid voltage, according to another aspect of the presently disclosed embodiment.

The second output current sensor 210 senses an output current of the grid-connected inverter 200 (400).

After operation 400, the second output current calculator 220 calculates the D-axis current and the Q-axis current of the output current that is sensed, to obtain the output current (402). The second output current calculator 220 calculates the D-axis current and the Q-axis current of the sensed output current, and calculates the output current by obtaining a root value of a sum of the square of the D-axis current and the square of the Q-axis current.

After operation 402, the second output current controller 230 determines whether the output current exceeds the restricted current (404). The restricted current denotes a limit current at which the output current does not cause the breakdown of the grid-connected inverter.

After operation 404, if the calculated output current exceeds the restricted current, the second output current controller 230 decreases the output current by a predetermined value (406). Since the grid voltage is likely to be abnormal when the calculated output current exceeds the restricted current, the second output current controller 230 controls the grid-connected inverter 200 to decrease the output current by a predetermined value. Accordingly, the grid-connected inverter 200 outputs the output current that has decreased less than the restricted current by the predetermined value.

After operation 406, the second output current controller 230 determines whether a predetermined time period has passed after the output current has decreased (408). Here, the predetermined time period denotes a sufficient time to solve the abnormality of the grid voltage.

After operation 408, if the predetermined time period has passed, the second output current controller 230 returns the decreased output current to the original magnitude (410). If the predetermined time period has passed, the second output current controller 230 controls the grid-connected inverter 200 so that the decreased output current increases to the original magnitude, and accordingly, the grid-connected inverter 200 outputs the output current of the original magnitude.

The method according to one or more aspects of the presently disclosed embodiment can also be implemented through computer readable code/instructions in/on a medium, e.g., a computer readable medium, to control at least one processing element to implement any above described aspects. For example, the method may be implemented in a universal digital computer operating the codes/instructions/programs by using a computer readable recording medium. Examples of the computer-readable recording medium are magnetic storage media (e.g., ROM, floppy disks, hard disks, magnetic tapes, etc.) and optical recording media (e.g., CD-ROMs, or DVDs).

While this disclosure has been particularly shown and described with reference to aspects thereof, it will be understood by those of ordinary skill in the art that various changes in form and details may be made therein without departing from the spirit and scope of the following claims. The aspects of the presently disclosed embodiment should be considered in a descriptive sense only and not for purposes of limitation. Therefore, the scope of the disclosure is defined not by the detailed description of the disclosure but by the appended claims, and all differences within the scope will be construed as being included in the disclosure.

What is claimed is:

1. An apparatus for protecting a grid-connected inverter from a low grid voltage, the apparatus comprising:
   a first output current sensor configured to sense an output current of the grid-connected inverter;
   a first output current calculator configured to calculate a first output current based on a D-axis current and a Q-axis current of the output current; and
   a first output current controller configured to determine whether a difference between the first output current and a reference value exceeds a predetermined range, and to decrease the output current to less than the reference value when the difference between the first output current and the reference value exceeds the predetermined range;
   wherein the reference value is an output current when a grid voltage is normal;
   wherein the predetermined range is a range limit from the reference value, in which an output current does not cause breakdown of the grid-connected inverter.

2. The apparatus of claim 1, further comprising a first timer configured to count a predetermined time period after decreasing the output current by the predetermined value;
   wherein the first output current controller determines whether the predetermined time period has passed, and returns a decreased output current to the output current of an original magnitude.

3. A method of protecting a grid-connected inverter from a low grid voltage, the method comprising:
   sensing an output current of the grid-connected inverter by using a first output current sensor;
   calculating a first output current based on a D-axis current and a Q-axis current of the output current by using a first output current calculator;
   determining whether a difference between the first output current and a reference value exceeds a pre-determined range by using a first output current controller; and
   when the difference between the first output current and the reference value exceeds the predetermined range, decreasing the output current to less than the reference value by the first output current controller;
   wherein the reference value is an output current when a grid voltage is normal;
   wherein the predetermined range is a range limit from the reference value, in which the output current does not cause breakdown of the grid-connected inverter.

4. The method of claim 3, further comprising:
   determining whether a predetermined time period has passed after decreasing the output current by the pre-determined value by using a first timer; and
   when the predetermined time period has passed, returning the output current that has decreased to the output current of an original magnitude by the first output current controller.

* * * * *